June 19, 1956   L. LEE, II   2,751,026
PROPELLER PITCH CONTROL APPARATUS
Filed July 19, 1947   7 Sheets-Sheet 7
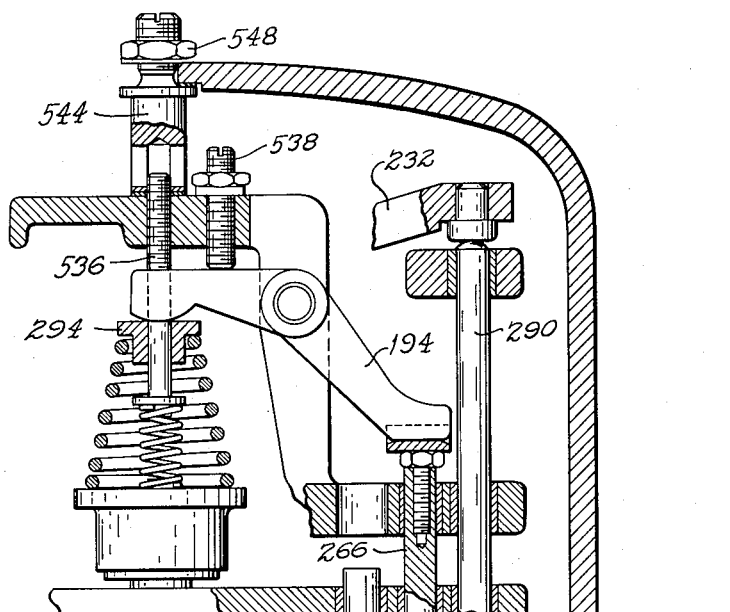
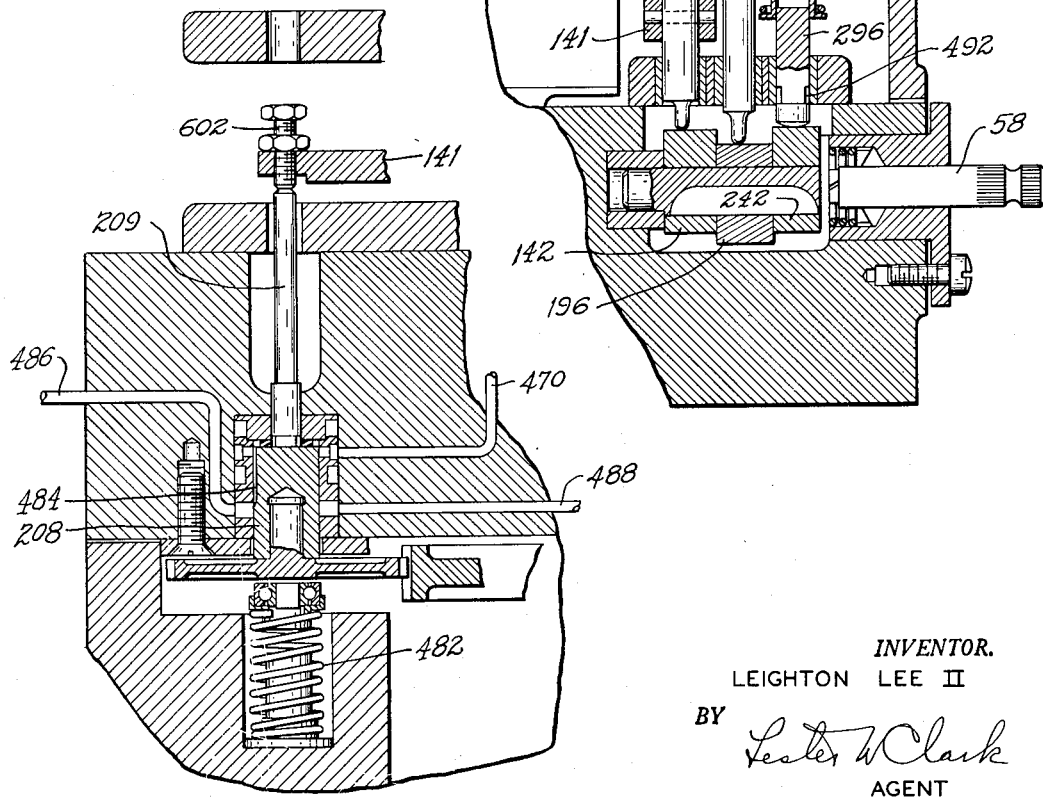
INVENTOR.
LEIGHTON LEE II
BY Lester W Clark
AGENT

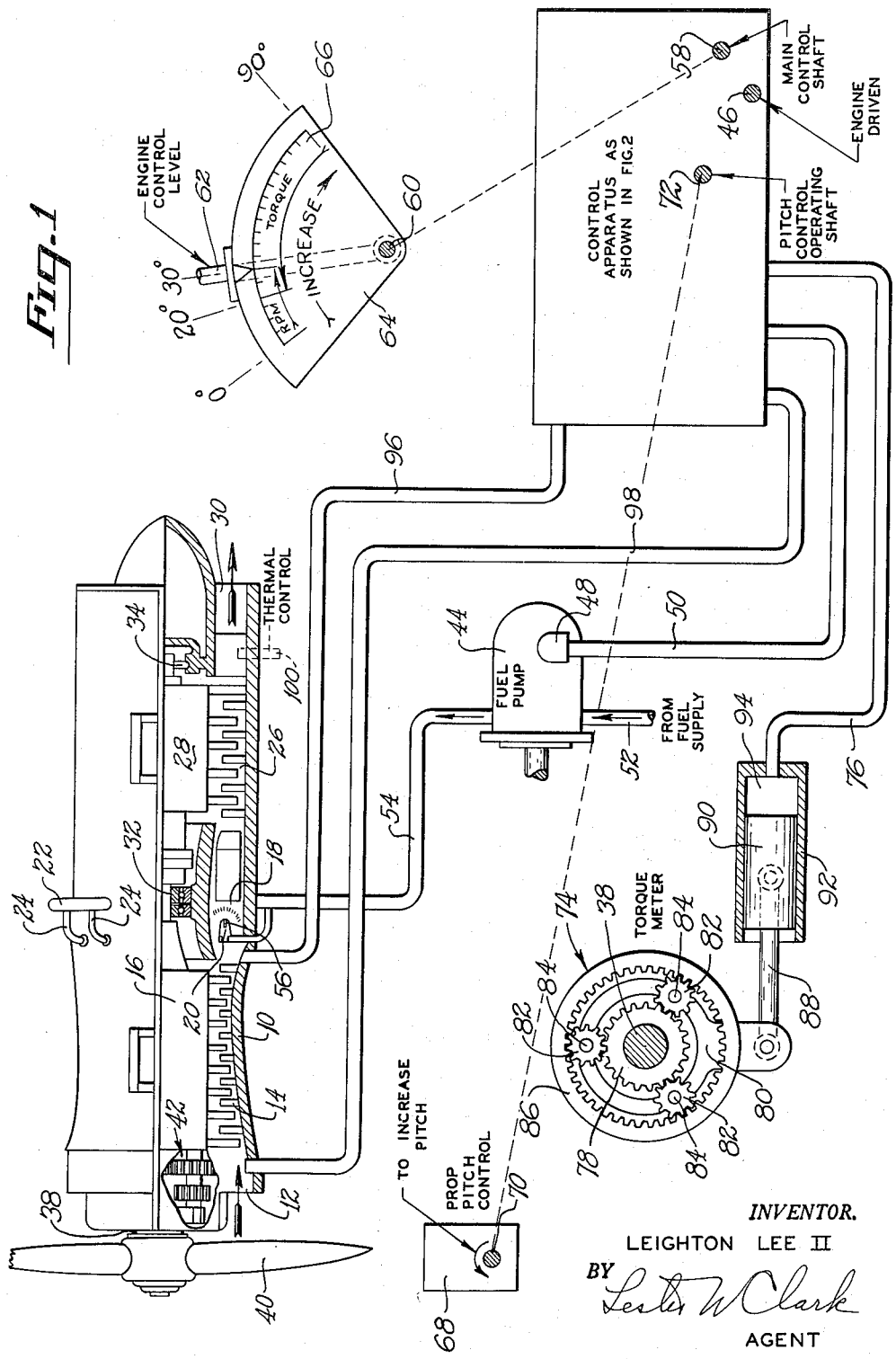
June 19, 1956 — L. LEE, II — 2,751,026
PROPELLER PITCH CONTROL APPARATUS
Filed July 19, 1947 — 7 Sheets-Sheet 1
INVENTOR.
LEIGHTON LEE II
BY Lester W Clark
AGENT

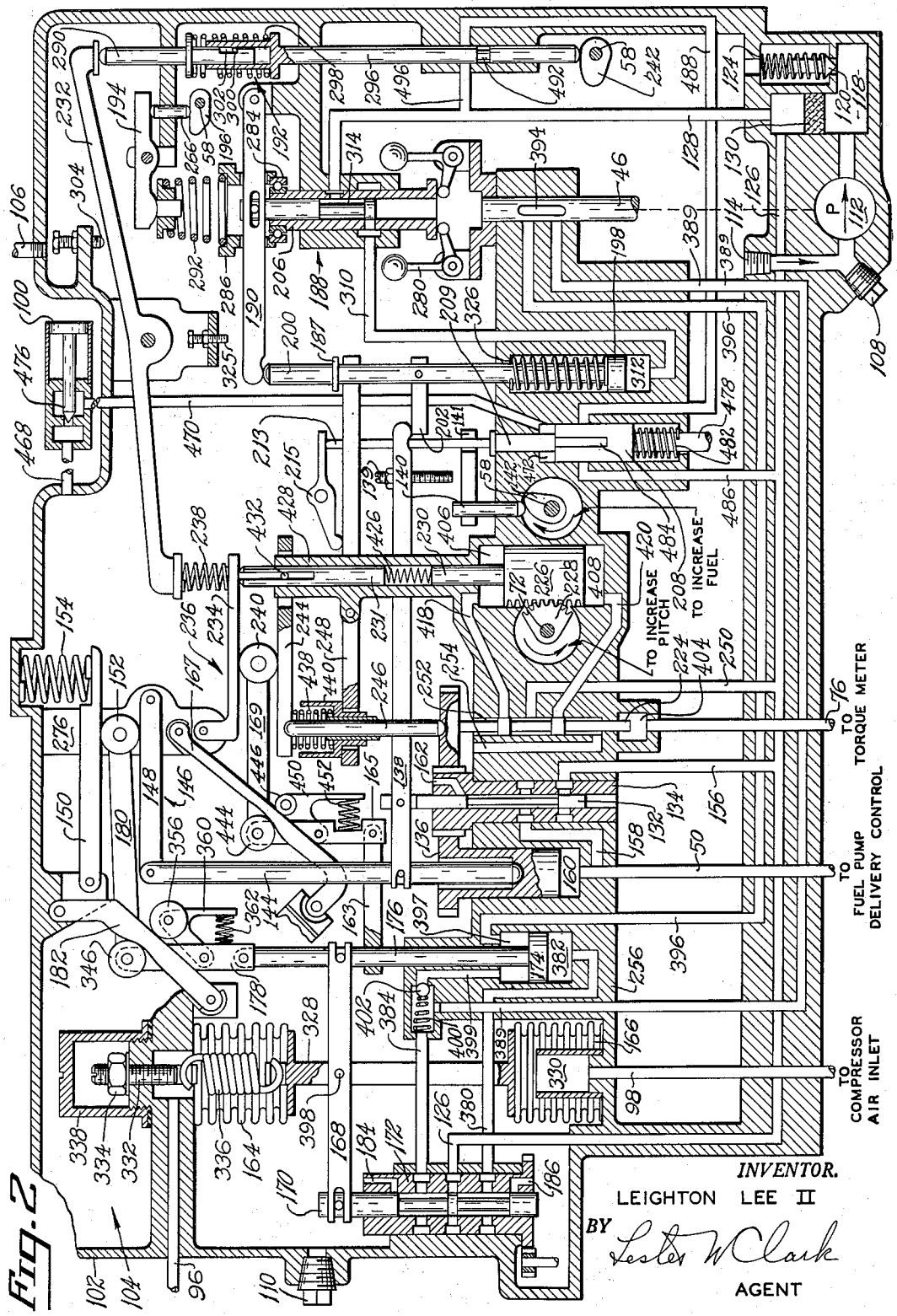

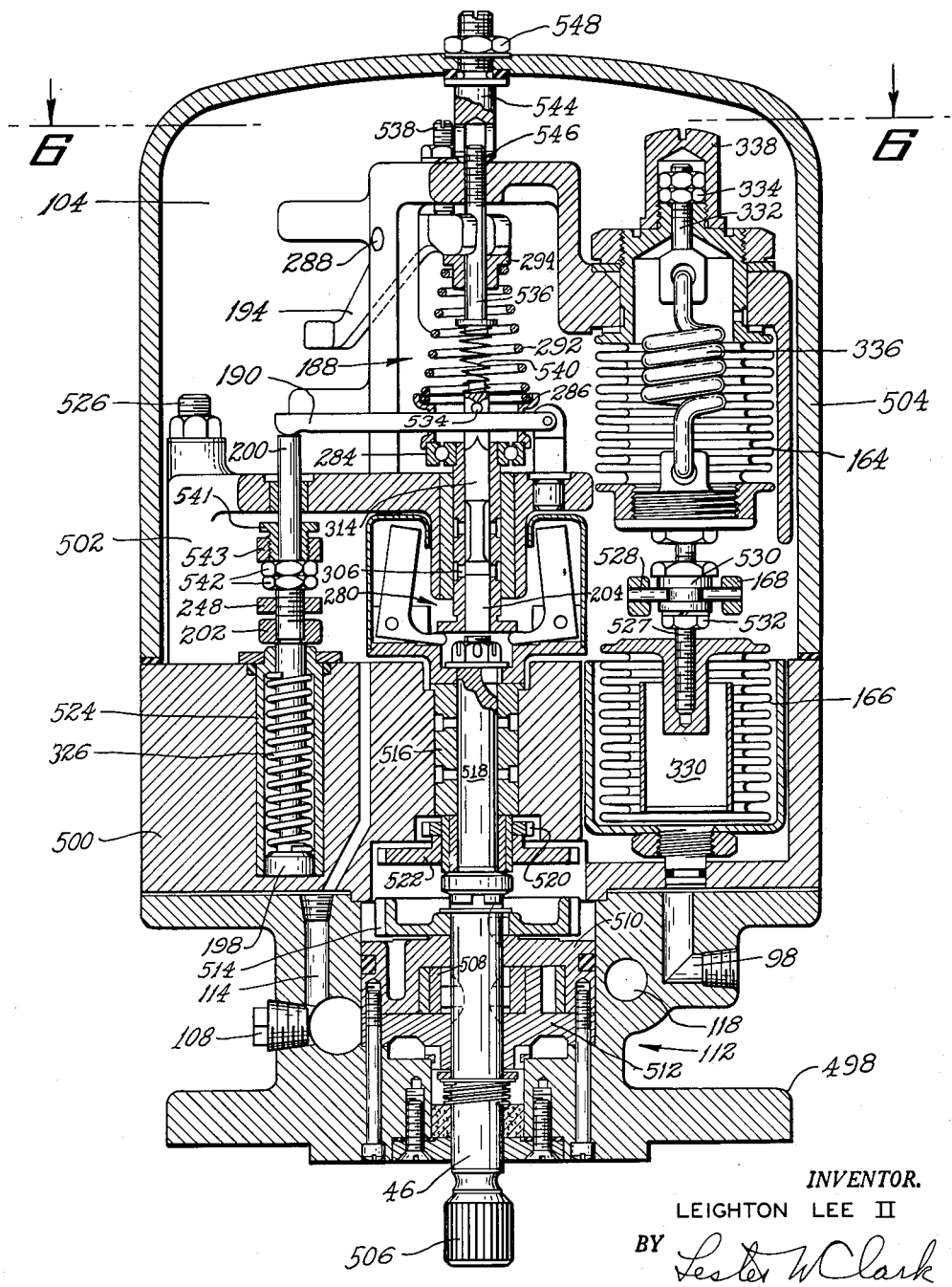

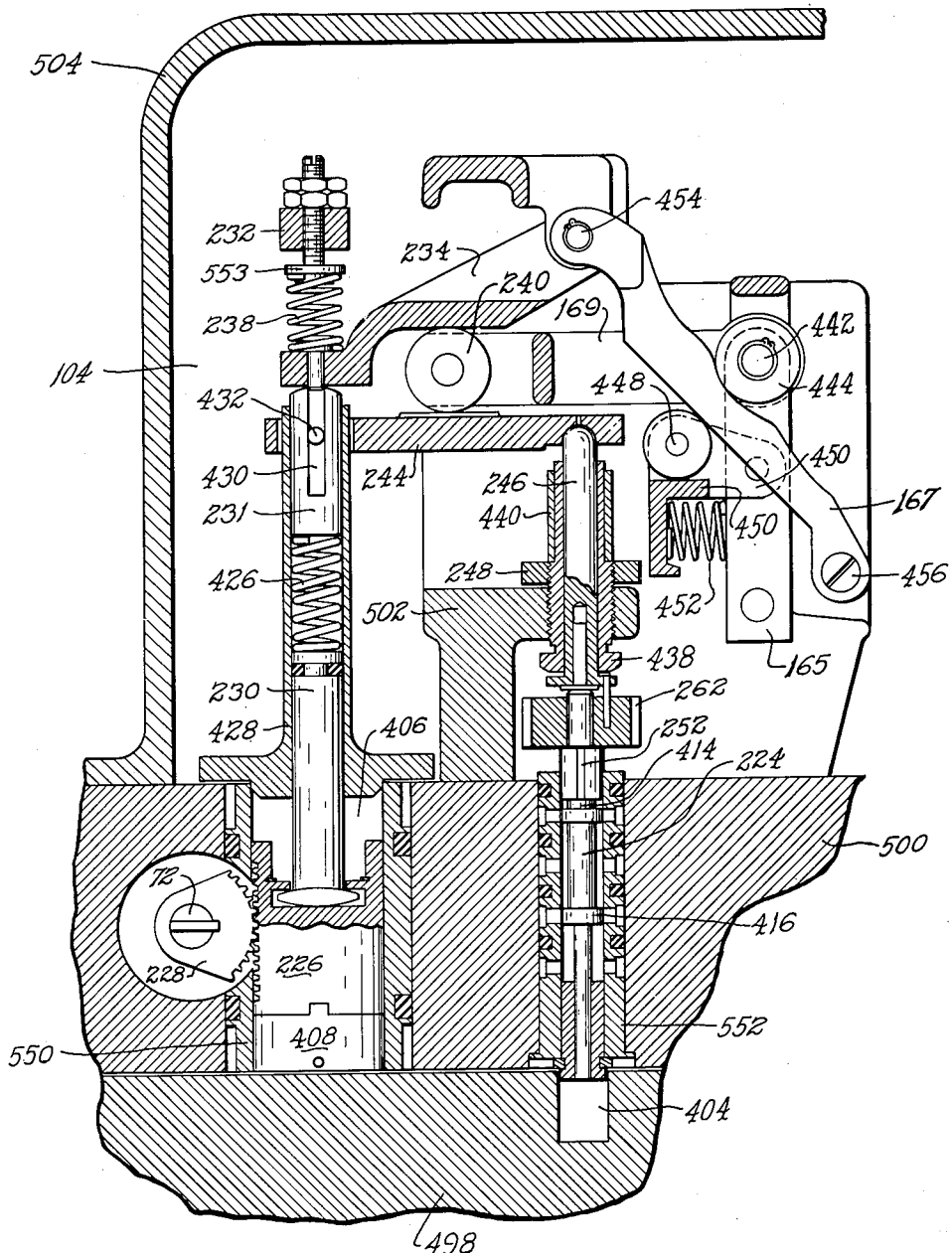

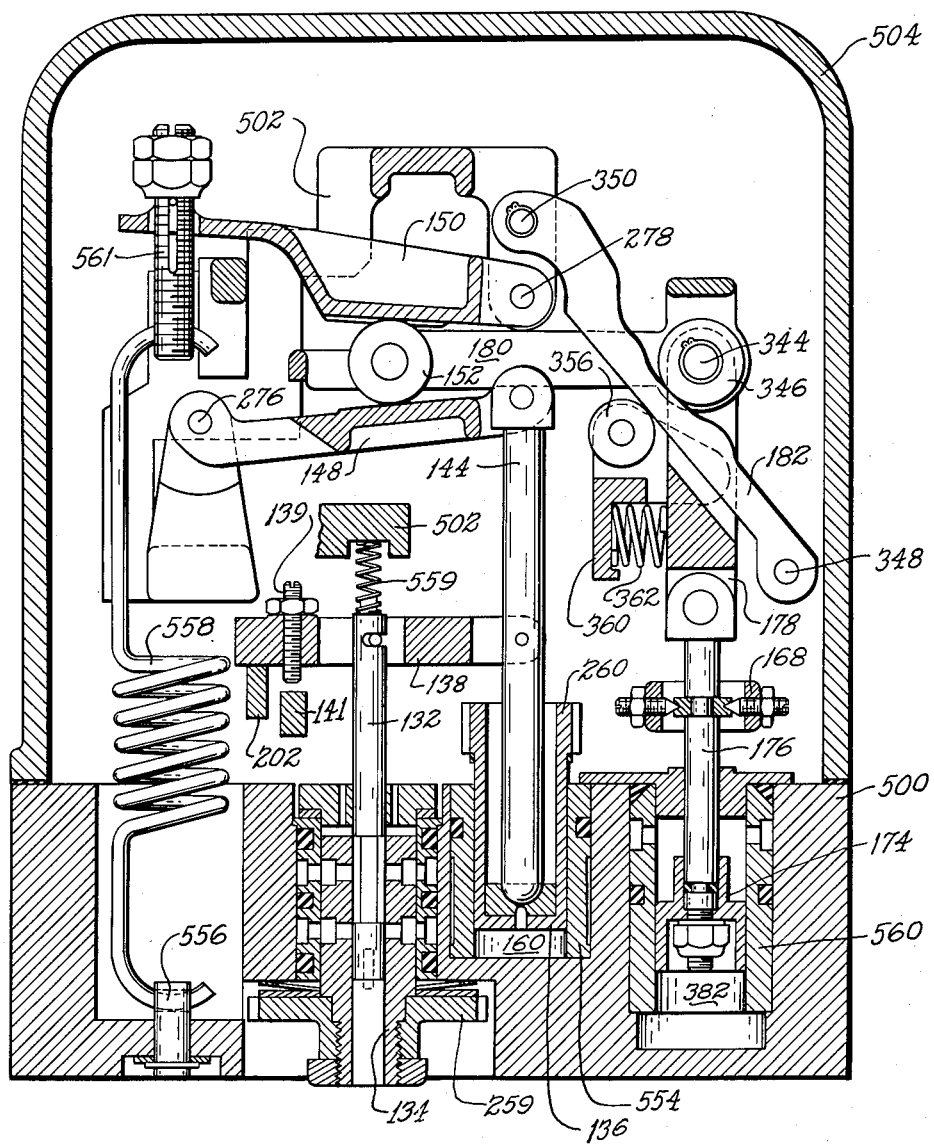

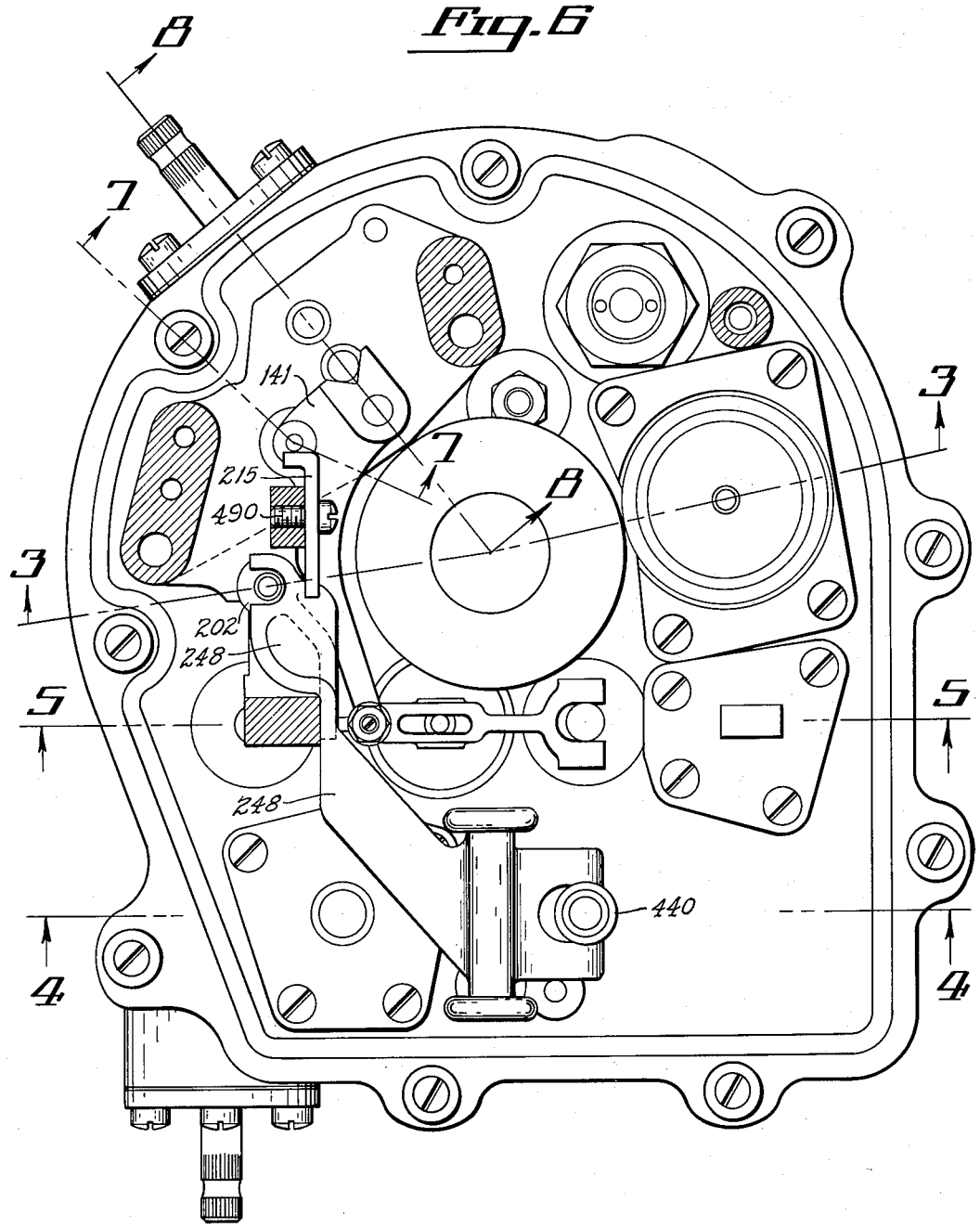

2,751,026

PROPELLER PITCH CONTROL APPARATUS

Leighton Lee II, Rocky Hill, Conn., assignor, by mesne assignments, to Pratt & Whitney Company, Incorporated, West Hartford, Conn., a corporation of Delaware Application July 19, 1947, Serial No. 762,038

1 Claim. (Cl. 170—135.72)

The present invention relates to fuel and torque control apparatus for prime movers, and especially to such control apparatus for internal combustion engines including gas turbine engines and combination gas turbine-and-jet engines.

The particular embodiments of my invention, as described herein, are intended for the control of fuel delivered to a jet type internal combustion engine suitable for propeller-propulsion or combined propeller-and-jet propulsion of aircraft, and for controlling the propeller torque.

Such an engine usually includes an air inlet, an air compressor, one or more combustion chambers, a gas turbine, and a tail pipe for discharging combustion gases to the atmosphere. Associated with the engine is a fuel system including a fuel pump for delivering fuel to the combustion chambers to control the engine speed and power. Included in such an engine there is also a gear train for driving a propeller shaft and a propeller at a speed usually less than engine speed.

Owing to structural and metallurgical restrictions, an engine such as described cannot be safely operated at speeds and temperatures exceeding predetermined limiting values. It is therefore desirable to regulate the fuel flow to such engines in response to engine speed and temperature so as to prevent excessive values of those variables.

Because a fixed-pitch propeller cannot perform equally well under all conditions of flight, it is customary to employ variable-pitch propellers which are efficient with a low-pitch setting under conditions of take-off and climb at relatively high engine speed and power, and are also efficient with a higher pitch setting under normal conditions of cruising speeds and power. When desired, variable-pitch propellers may be used to obtain constant engine speed at varying values of engine torque and brake-horsepower.

For a given condition of engine speed (R. P. M.) and brake-horsepower (B. H. P.), the engine torque (T) varies according to the relationship.

$$T = \frac{k \text{ B. H. P.}}{\text{R. P. M.}}$$

in which ($k$) is a constant. When the propeller absorbs substantially the total brake-horsepower of the engine as is the case when the engine is being used for propeller propulsion, the ratio of propeller torque to engine torque is substantially equal to the inverse ratio of propeller speed to engine speed, which ratio is generally constant. By varying the propeller pitch, the propeller torque corresponding to a given value of engine speed and power can be regulated to permit combined propeller-and-jet propulsion within a range predetermined by the engine design.

Objects of the present invention are:

1. To provide improved fuel and torque control apparatus for an internal combustion engine;

2. To provide improved control apparatus for an internal combustion engine driving a variable load, including fuel and speed control apparatus substantially as shown in my copending application Serial No. 746,975, dated May 5, 1947, now U. S. Patent No. 2,675,674, and improved means for concurrently varying said load to control the torque absorbed thereby;

3. To provide in such apparatus five component coordinated hydraulic systems for regulating the fuel flow and the engine torque, said systems being respectively responsive to manual control, pressure, temperature, and speed conditions of the engine, and to the torque absorbed by said variable load, wherein there are improved cam and lever mechanisms for modifying the operation of the manual and torque control systems by the pressure responsive system;

4. To provide, in fuel and torque control apparatus such as described, improved means for overriding the manually operated means and the pressure responsive means to permit higher engine temperatures in a predetermined emergency range of operation than in a corresponding normal range of operation; and 5. To provide in such apparatus improved means for overriding the manually operated torque varying means when predetermined values of engine speed and temperature are exceeded.

Other objects and advantages of the present invention will become apparent from a consideration of the appended specification, claim, and drawing, in which:

Figure 1 shows, somewhat diagrammatically, an engine suitable for propeller propulsion of aircraft together with its associated fuel pump, an engine control lever, a torque meter for measuring the propeller torque, a propeller pitch control and principal connections with the fuel and torque control apparatus of Fig. 2;

Fig. 2 shows, also somewhat diagrammatically, fuel and torque control apparatus embodying the principles of my invention;

Fig. 3 is a cross-sectional elevational view of the apparatus shown diagrammatically in Fig. 2, taken on the line 3—3 of Fig. 6, showing portions of the speed and pressure responsive systems;

Fig. 4 is a cross-sectional elevational view of the apparatus of Fig. 3, taken on the line 4—4 of Fig. 6, showing portions of the torque and pressure responsive control systems;

Fig. 5 is a cross-sectional elevational view of the apparatus of Figs. 3 and 4, taken on the line 5—5 of Fig. 6, principally showing portions of the manually operated control system;

Fig. 6 is a cross-sectional plan view of the apparatus of Figs. 3, 4 and 5, taken on the line 6—6 of Fig. 3 for identifying the respective locations of the sections shown in Figs. 3, 4 and 5;

Fig. 7 is a cross-sectional view on the line 7—7 of Fig. 6, showing a portion of the temperature responsive system, and Fig. 8 is a cross-sectional view on the line 8—8 of Fig. 6, showing the manual control mechanism.

*Fig. 1*

Referring to the drawing, Fig. 1, there are shown the principal elements of the engine above referred to, as follows: a supporting casing 10, an air inlet 12, a multistage compressor 14, a compressor rotor shaft 16, one each of a number of combustion chambers 18, one of a corresponding number of fuel discharge nozzles 20 connected to a generally circular manifold 22 by means of a conduit 24, a multi-stage turbine 26, a turbine rotor shaft 28 for driving shaft 16, a tail pipe 30 for discharging combustion gases from turbine 26, a center bearing 32 and end bearings 34 and 36 supported by casing 10, a propeller shaft 38, to which is fixed a propeller 40, a gear train 42 connecting shafts 16 and 38, connections to the gear train for operating the engine accessories, including a fuel pump 44 and the diagrammatically illustrated control apparatus of Fig. 2, which has a main drive shaft 46 operated at a speed proportional to engine speed.

The engine shown employs a multi-stage turbine such as is necessarily employed for propeller-propulsion. Engines used solely for jet propulsion customarily have a single stage turbine for driving the compressor and accessories.

The fuel pump 44 is provided with delivery varying means diagrammatically shown at 48, which is responsive to the variable control oil (VCO) pressure ($p_C$) transmitted to the delivery varying means from the control apparatus through a conduit 50. Pump 44 is connected to a source of fuel (not shown) by an inlet conduit 52 and supplies fuel at a pressure ($p_F$) to manifold 22 in the engine through a fuel pump discharge conduit 54.

In each of the discharge nozzles 20 there is a series of fixed slots, one of which is indicated at 56, through which fuel enters the nozzles from conduits 24. Fuel flow from the nozzles is directly proportional to the effective area of slots 21 and is a square root function of the drop across the slots between the pressure in conduits 24, which is substantially equal to pressure ($p_F$), and the pressure in the combustion chambers. It follows, therefore, that the fuel pump delivery is a function of the pressure ($p_F$) in the pump discharge conduit 54. When it is desired to limit the range of fuel pressure so that its value at maximum fuel flow is less than that corresponding to the square root function of the drop across slots 56, the nozzles may be provided with auxiliary slots supplied by another manifold connected to conduit 54 through a pressure responsive flow divider which opens at a predetermined value of the pressure ($p_F$). In this manner the pressure ($p_F$) may be maintained sufficiently high to produce satisfactory nozzle discharge without requiring the pump to operate under unfavorable pressure conditions at maximum flow.

A main control shaft 58 in the fuel and torque control apparatus is connected to a shaft 60 operated by an engine control lever 62 adjacent a fixed quadrant 64. As indicated by legend and a calibrated scale 66 on quadrant 64, and as subsequently explained, the control apparatus is constructed so that, as the control lever is advanced in a clockwise direction between 0° and 90° positions, the engine speed (R. P. M.) and propeller torque vary according to the following schedule:

| Control Lever 62 Positions, Degrees | Engine, R. P. M. | Propeller Torque |
|---|---|---|
| 0 | Minimum | Minimum. |
| 0–20 | Increases | Do. |
| 20 | Less than Maximum | Do. |
| 20–30 | Increases to Maximum | Increases. |
| 30 | Maximum | Less than Maximum. |
| 30–90 | ----do---- | Increases to Maximum. |
| 90 | ----do---- | Maximum. |

The schedule shown above applies to the particular embodiments described herein and may be modified as desired to provide suitable variations of speed and torque control within such limits as may be imposed.

In the hub of propeller 40 there is a propeller pitch control, diagrammatically shown at 68, operated by a shaft 70 controlled by a pitch control operating shaft 72 in the control apparatus. The propeller pitch, and hence the propeller torque corresponding to any given value of propeller speed, is varied by operation of shaft 72.

A measure of the engine torque is transmitted from a torque meter 74 to the control apparatus by the pressure ($p_T$) in a conduit 76. Torque meter 74 as shown in Fig. 1 is a simplified form of conventional meter and includes: a sun gear 78 fixed to propeller shaft 38; a spider 80 concentric with gear 78 and connected thereto by three symmetrically disposed planet gears 82 rotatable on stub shafts 84 fixed in spider 80; and an outer ring 86 engaging the planet gears 82 and rotatable by gear train 42 for driving the propeller shaft through torque meter 74. The force required to hold the spider 80 stationary is a measure of the shaft torque and is transmitted by the spider through a rod 88, to a piston 90 in a cylinder 92, on which it acts in opposition to the pressure ($p_T$) in a chamber 94. As shown, the left-hand end of piston 90 is subject to atmospheric air pressure, but any suitable hydraulic pressure may alternately be employed if desired. No flow occurs from chamber 94 or conduit 76 except as a result of leakage and means may be provided to compensate such leakage. The pressure in chamber 94 is transmitted through conduit 76 to a chamber 404 in Fig. 2. The chambers 94 and 404 and conduit 76 form a closed system, so that the pressure in chamber 404 is a measure of the engine torque. An alternative form of torque meter is shown incidentally in my co-pending application Serial No. 654,979, filed March 16, 1946, now U. S. Patent No. 2,450,835.

The compressor discharge pressure ($p_D$) is transmitted from the engine to control apparatus by a conduit 96, and the compressor inlet pressure ($p_E$) is similarly transmitted to the apparatus through a conduit 98.

*Fig. 2*

Referring to Fig. 2, there is shown somewhat diagrammatically an embodiment of my invention having all elements except a thermal control 100 enclosed in a casing 102. To facilitate manufacture and assembly the casing may comprise several separable castings as shown in the embodiment of Figs. 3 to 7.

The apparatus is a self-contained hydraulic system employing the interior of casing 102 as a reservoir 104 which is maintained approximately full of suitable hydraulic fluid at a pressure ($p$) in order to permit the working elements to operate in an oil bath, and which is vented at a vent tube 106 to the atmosphere or other desired pressure source. If desired, reservoir 104 may be connected to the oil system of the engine. In that case, a pair of threaded plugs 110 and 108 are removed from casing 102 and replaced by drain and return conduits, respectively, which are connected to the engine oil system. In that event, plug 108 is placed in inlet conduit 114, so that pump 112 must draw fluid from the external system instead of the reservoir 104.

The main drive shaft 46 operates an hydraulic pump 112 which pumps fluid from reservoir 104 into a chamber 118. The pressure in chamber 118 is maintained at a substantially constant value, for example, 250 p. s. i, by a relief valve 120. Valve 120 allows fluid to flow from chamber 118 past valve 120 and into reservoir 104. A spring 124 biases valve 120 toward closed position with a substantially constant force which determines the value of the pump discharge pressure. Fluid discharged by the pump flows through a filter 130 to two main delivery conduits 126 and 128.

The control apparatus comprises five mechanically and hydraulically cooperative component systems for regulating the fuel flow and the propeller torque. These five systems are briefly outlined in the immediately following numbered paragraphs:

(1) A manual control system principally including a main servo valve 132, a main servo valve sleeve 134, a main power piston 136, a main floating lever 138, a push rod 140, a finger 141 carried by rod 140 and engaging an adjusting screw 139 carried by lever 138, a cam 142 fixed to the main control shaft 58, a piston rod 144 operated by piston 136, and a lever mechanism indicated at 146, including a pair of levers 148 and 150, a movable fulcrum bearing 152 and a spring 154. Fluid flows discontinuously to the manual control system through a conduit 156 connected to conduit 126 and is drained from the manual control system through an outlet passage 162 in the main servo valve sleeve 134. The variable control oil pressure ($p_c$) is transmitted from a chamber 160 below the main power piston 136 in the manual control system through a conduit 50 to the delivery varying means shown in Fig. 1.

(2) A torque control system principally including a torque control servo valve 224, a torque control power piston 226 and a segmental gear 228 for operating torque control shaft 72, a piston rod 230 and a follower rod 231; a pair of levers 234 and 244 in a lever mechanism 236 which also includes a spring 238, a fulcrum bearing 240; a torque control cam 242 on control shaft 58, and a collapsible push rod assembly 192 and a lever 232 for transmitting motion of cam 242 to spring 238 to control the loading of the spring; a push rod 246, and a floating lever 248. Fluid flows discontinuously to the torque control system through a conduit 250 connected to conduit 126 and is drained from this system through two outlet passages 252 and 254.

(3) A barometric control system principally including a pair of bellows 164 and 166 whose interiors are respectively connected to conduits 96 and 98, a barometric floating lever 168, a barometric servo valve 170 and a servo valve sleeve 172, a barometric power piston 174, a piston rod 176 and a link 178 for operating a positioning bar 180, and a fixed elongated barometric cam 182. The compressor pressure differential acting through bellows 96 and 98 controls valve 170 and piston 174. The variable control oil pressure ($p_c$) is made a function of the compressor pressure differential ($p_D - p_E$) by transmission of movement of power piston 174 through rod 176, link 178, and positioning bar 180 to the fulcrum bearing 152 in the manual control system. The barometric control system also includes a bar 163 fixed to piston rod 144 and supporting a link 165, a fixed elongated cam 167 and a positioning bar 169 for varying the position of bearing 240 to render the propeller torque a function of the barometric control. Fluid flows discontinuously to the barometric control system through conduit 126 and is drained from the manual control system through a pair of upper and lower outlet passages 184 and 186, in the barometric servo valve sleeve 172.

(4) A speed control system principally including a governor mechanism generally indicated at 188, a governor floating lever 190, a governor push rod 266, a setting lever 194, a cam 196 on the main control shaft 58, and an overspeed power piston 198 having a rod 200 attached thereto for operating lever 190. The speed control system renders the variable control oil pressure ($p_c$) a function of the engine speed by modifying movement of the main floating lever 138 in the manual control system in response to movement of a finger 202 fixed to rod 200. The speed control system also includes a flange 187 for engagement with the torque control floating lever 248 to override the torque control system, as later explained. Fluid flows discontinuously to the speed control system through conduit 128 and is drained from that system through the central bore in the lower end of governor valve sleeve 206 in governor mechanism 188.

(5) A thermal control system including thermal control 100, a thermal piston 208 and a piston rod 209 for engaging finger 141 fixed to push rod 140 to override the manual control system and hence to modify the variable control oil pressure ($p_c$) as a function of the engine temperature. The thermal control system also includes an extension 213 of push rod 209 for operating a lever 215 to modify the position of floating lever 248, thereby rendering the propeller torque subject to override control by the temperature control system, as is later explained in detail. Normally, there is no fluid flow through the thermal control system; but, when a predetermined limiting temperature is exceeded, oil flows from the main fluid conduit 126 successively through a conduit 486 and a slot 484 in piston 208 to a chamber above the piston 208, through a conduit 470, thermal control 100, and a conduit 468 to reservoir 104. Under conditions hereinafter specified, fluid also flows to chamber 472 from conduit 128, through a conduit 496, an annular undercut 492 on the lower end of a push rod 296, a conduit 488 and the slot 484.

Manual control system

A wall 256 provided in reservoir 104 is suitably bored or otherwise machined for housing and operation therein of some elements of each of the five component control systems previously defined.

The upper ends of main servo valve sleeve 134, power piston 136, and torque servo valve 224 carry gears by which those elements are rotated. These gears are driven by a suitable connection (not shown) with the main drive shaft. The purpose of rotation of valve sleeve 134, piston 136, and servo valve 224 is to prevent sticking of the valves and the piston when these parts are slidably operated with respect to their guiding surfaces. The required speed of rotation is not necessarily a function of engine speed and other driving means may be employed, if desired.

The main servo valve sleeve 134 is provided with a pair of circumferential grooves in its outside surface and one or more corresponding ports drilled radially at the vertical centers of the grooves. The upper end of conduit 156 opens into one of the grooves. The other groove is connected to the upper end of a conduit 158, leading to chamber 160 and conduit 50.

Valve 132 is undercut to form upper and lower lands separated by an annular chamber. The valve 132 has a neutral position as shown in Fig. 2 in which the lower land just covers the ports leading to conduit 156, and the upper land just covers the ports leading to outlet passage 162. The range of travel of valve 132 is such that the ports leading to conduit 158 are always in communication with the annular chamber between the lands on the valve. When the valve is displaced downwardly so that conduit 156 also communicates with the annular chamber, fluid flows from conduit 156 past the valve into conduit 158, and conduit 50 and chamber 160. The variable control oil pressure ($p_c$) in conduit 50 and chamber 160 is thus increased, thereby increasing the fuel flow. Similarly, when the main servo valve 132 is displaced upwardly so that the annular chamber thereon opens into outlet passage 162, fluid flows from chamber 160 and conduit 50, through conduit 158, past valve 132, and thence through outlet passage 162 to reservoir 104, thereby decreasing the variable control oil pressure ($p_c$) and hence the fuel flow.

Piston rod 144 has a pin-and-slot connection with the left end of the main floating lever 138 and a spherical self-aligning connection between its lower end and the bored interior of main power piston 136 to allow slight angular displacement of the rod in respect to the piston without causing the latter to bind in wall 256. The upper end of rod 144 is pivoted to the left end of lever 148 in mechanism 146, lever 148 having its rightward end pivoted on a fixed support 276. Above lever 148, mechanism 146 includes the lever 150 which has its leftward end pivoted in a fixed support at a point above and approximately on the centerline of piston 136. The right end of lever 150 is biased downwardly by the spring 154 which is compressed between a portion of casing 102 and lever 150. A portion of the downward force of spring 154 is transmitted from lever 150 to lever 148 through the bearing 152, the lateral position of which may be regarded as fixed in order to consider the operation of the manual control system independently of the barometric control system.

Piston 136 is subjected to an upward force proportional to the differential between the respective pressures in chamber 160 and reservoir 104, and to a portion of the downward force of spring 154 which is transmitted to the piston through lever mechanism 146 and rod 144. The rate of spring 154 is high, so that the pressure differential and hence the variable control oil pressure ($p_c$) may vary throughout a wide range of values corresponding to a relatively narrow range of movement of the piston, which assumes whatever position is required to maintain equilibrium between the forces acting thereon.

While the drawing shows the right end of floating lever 138 engaged with finger 202, when considering the manual control system independently of the speed control system, as in the present discussion, it may be assumed that the right end of lever 138 is free and that the adjusting screw 139 carried by the lever is in contact with finger 141 carried by push rod 140. Lever 138 is consequently positioned by push rod 140 and piston rod 144 and is effective to position the main servo valve 132 accordingly. As shown in the drawing, both ends of valve 132 are subject to the pressure ($p$) in reservoir 104 so that that pressure does not apply any force to lever 138. In the neutral position of the servo valve, the manual control system is in a state of equilibrium; i. e., there is no flow of fluid through the system, the pressure ($p_c$) has the value required to maintain piston 136 in a position corresponding to the position of cam 142 and the neutral position of valve 132, and the pump delivery corresponds to the value of pressure ($p_c$) trapped in the system by closure of the servo valve.

Upon clockwise movement of the engine control lever 62, Fig. 1, and consequent clockwise movement of the main control shaft 58 and cam 142, push rod 140 moves downward and lever 138 moves clockwise about its connection with rod 144, thereby depressing valve 132 below its neutral position. The variable control oil pressure ($p_c$) consequently increases, as previously explained, and the fuel flow increases accordingly. Pressure ($p_c$) continues to increase until piston 136 responds by raising lever 138 and valve 132 a sufficient amount to restore the valve to its neutral position, following which no further change occurs as long as the positions of control shaft 58 and cam 142 remain undisturbed. Similarly, upon counterclockwise movement of control lever 62 and corresponding counterclockwise movements of shaft 60, control shaft 58, and cam 142, lever 138 moves counterclockwise about its connection with rod 144 and servo valve 132 is elevated above its neutral position. In this case, as previously explained, the value of pressure ($p_c$) and hence the fuel flow decrease, continuing to do so until piston 136 responds by lowering rod 144 and lever 138 to new positions at which servo valve 132 is again restored to its neutral position. Under steady state conditions, when servo valve 132 is in its neutral position, the value of the variable control oil pressure ($p_c$), and hence the rate of fuel flow to the engine, is determined by the position of control shaft 58 for a given fixed position of bearing 152 in lever mechanism 146.

The manual control system provides a means of regulating the variable control oil pressure ($p_c$) from minimum to maximum values corresponding to a predetermined range of clockwise movement of the engine control lever 62, Fig. 1, and depending upon the downward force transmitted by rod 144 to the main power piston 136.

Again referring to Fig. 1, it is noted that scale 66 on quadrant 64 is calibrated in terms of engine R. P. M. and propeller torque, without reference to fuel flow. According to the previously defined schedule of events corresponding to movement of control lever 62, either or both engine speed and torque are increased as the lever is advanced throughout its 90° range of movement so that an increasing fuel supply to the engine is required when the lever is advanced from any given position to any other position whether the scheduled result is to increase speed only, as in the 0°–20° interval; or to increase torque only, as in the 30°–90° interval; or, to increase both speed and torque as in the intermediate 20°–30° interval. It follows, therefore, that as the lever moves in a clockwise direction, the lift of cam 142 continuously decreases and the value of the variable control oil pressure ($p_c$) continuously increases to provide the required increasing supply of fuel to the engine. The contour of cam 142 is determined by speed and torque requirements of the engine and design of the control apparatus.

*Speed control system*

The governor valve mechanism 188 includes flyballs 280 operated by the main drive shaft 46 and acting to vary the vertical position of governor valve sleeve 206 as a function of engine speed. The valve sleeve is rotatable and slidable in a suitably bored projection of casing 102. The upper end of sleeve 206 carries the inner race of a ball bearing assembly 284. The outer race of assembly 284 is attached to a lower governor spring retainer 286. Retainer 286 is in the form of a sleeve, and is provided near its center with diametrically opposite slots so that lever 190 may pass through it. These slots are elongated so that lever 190 and retainer 286 are independently movable in relation to each other in a vertical plane. Setting lever 194 is pivoted approximately at the center of its length on a fixed pin and has its right end supported by governor push rod 266. A governor spring 292 is compressed between lower retainer 286 and an upper governor spring retainer 294 carried by lever 194, whereby the right end of setting lever 194 is maintained in engagement with push rod 266. Bearing assembly 284 permits sleeve 206 to rotate while retainer 286 remains stationary and hence prevents torsional stress in spring 292.

In the particular embodiment shown, the downward force of governor spring 292 varies substantially directly with the spring deflection and the upward force due to flyballs 280 is proportional to the square of the engine speed. When these forces are in equilibrium, there is no vertical movement of sleeve 206. Cam 196 is generated so that as control lever 62 is advanced clockwise throughout the initial 30° range in reference to the uniformly calibrated R. P. M. portion of scale 66, Fig. 1, the deflection of spring 292 is correspondingly varied at a non-uniform rate (to compensate for the non-linear variation of upward force with speed) so that the speed required to produce a state of equilibrium increases to the scale value corresponding to the fixed position of the lever to which the latter is advanced.

The position of the sleeve may vary over a predetermined range in which a port in the sleeve always opens into an annular recess in the support. This recess is connected by a conduit 310 to a chamber 312 below the overspeed power piston 198, the pressure in which is controlled by a governor valve 314 which slides within sleeve 206. Valve 314 has a pin-and-slot connection with governor lever 190. Valve 314 is undercut to form upper and lower lands separated by an annular chamber. This annular chamber is connected through a suitable port in sleeve 206 with the upper end of main fluid conduit 128 so that fluid in the annular chamber is maintained at the pump discharge pressure. The port is so formed that the annular chamber is always connected to conduit 128 throughout the ranges of travel of valve 314 and sleeve 206. The land at the lower end of valve 314 is just as wide as the port leading to conduit 310, so that when valve 314 is in its neutral position in respect to sleeve 206, as shown, that port is covered and no flow may occur through it.

The right end of governor lever 190 is pivoted on a fixed support and its left end is supported by rod 200. Movement of the overspeed power piston 198 and hence of rod 200, either upward or downward, controls movement of governor lever 190 and governor valve 314. Whenever the end of the main floating lever 138 is engaged with finger 202, and finger 141 carried by push rod 140 does not touch adjusting screw 139 carried by lever 138, then movement of piston 198 controls the position of lever 138 independently of cam 142, so that the speed control system is then effective to modify the fuel flow. A spring 326 biases piston 198 downwardly in opposition to the pressure differential acting on it so that there is a different predetermined position of piston 198 corresponding to each value of the differential.

An adjustable stop 325 may be provided for limiting upward movement of the overspeed power piston 198. A minimum value of the variable control oil pressure ($p_c$) and hence a minimum fuel flow is thereby established, in order to prevent burner "blowout" and consequent engine stoppage, which otherwise might occur during deceleration when the engine speed is much higher than that called for by the setting of cam 196.

*Coordination of the manual and speed control systems*

Both cam 142 in the manual control system and cam 196 in the speed control system are fixed to control shaft 58 for concurrent operation by control lever 62, Fig. 1.

In a condition of steady state operation at constant speed and constant fuel flow, the positions of all movable elements in both the manual and the speed control systems are stationary, except in respect to rotation; main servo valve 132 and governor valve 314 are in their neutral positions; and, as subsequently explained and as shown in Fig. 2, main floating lever 138 is supported by finger 202 so that there is a slight amount of clearance between finger 141 carried by push rod 140 and adjusting screw 139 carried by lever 138.

When the engine control lever 62 is advanced clockwise from the extreme counterclockwise or zero position such as shown in Fig. 1 to another position within the first 30° range of movement of the lever, the lift of cam 142 decreases and push rod 140 is further separated from lever 138 which is prevented from following the push rod by finger 202 in the speed control system. Concurrently with movement of cam 142, however, cam 196 also turns clockwise to elevate push rod 266 and to thereby turn setting lever 194 counterclockwise on its fulcrum. The downward force of governor spring 292 is thus increased and governor valve sleeve 206 is depressed from its neutral position in respect to valve 314 so that fluid flows from conduit 310 past the valve into reservoir 104, thereby decreasing the pressure in conduit 310 and chamber 312. The overspeed power piston 198 and rod 200 consequently move downward, allowing main floating lever 138 to turn clockwise about its connection with rod 144, thereby moving main servo valve 132 below its neutral position and producing increased fuel flow and engine speed.

In addition to allowing the right end of lever 138 to descend, downward movement of rod 200 and finger 202 simultaneously allows the left end of governor lever 190 and hence the governor valve 314 to move downward so as to reduce the flow from conduit 310, thereby retarding the decrease of pressure in chamber 312 and the resultant increase in the value of fuel flow. The engine speed continues to increase as the fuel flow increases, until the forces acting on sleeve 206 are in equilibrium and the valves 314 and 132 are restored to their neutral positions. The neutral position of valve 314 varies as the height of the sleeve varies in response to changes in engine speed and in the position of setting lever 194. Therefore, the position of piston 198 and rod 200 are determined by the engine speed and the position of lever 194 and hence of control lever 62.

The amount of clockwise movement of lever 138 about its connection with rod 144 corresponding to downward movement of rod 200 is limited by finger 141 on push rod 140. If the engine control lever is advanced sufficiently far and/or rapidly, in order to accelerate the engine, rod 200 quickly moves downward far enough so that downward movement of the right end of lever 138 is arrested by contact of the adjusting screw 139 with the finger 141 carried by push rod 140. In this condition, the manually controlled cam 142 determines the position of the right end of lever 138 and the speed control system becomes temporarily ineffective. The fuel flow to the engine during acceleration is therefore limited by cam 142. As the engine speed approaches the value corresponding to the position of control lever 62, the governor valve sleeve 206 rises and governor valve 314 descends so that when the engine speed has the desired value corresponding to the lever setting, port 306, Fig. 3, is closed by the valve. When this occurs, the screw 139 is again lifted out of contact with finger 141 by the action of finger 202 in the speed control system. During this process, the main power piston 136 rises to a new position corresponding to the new position of overspeed power piston rod 200. The barometric control system is so coordinated with the manual control system that the quantity of fuel which may be supplied to the engine as a function of the manual and barometric systems acting together has to be diminished by overriding operation of the speed control system in all conditions of steady state engine operation.

When the engine control lever 62 is retarded in a counterclockwise direction from one position to another in the 30°–0° range of lever movement, reversal of the above process takes place. Concurrently with upward movement of push rod 140, push rod 266 is lowered so that setting lever 194 reduces the deflection and load of governor spring 292 and governor valve sleeve 206 rises to permit flow of fluid from conduit 128 into conduit 310 and chamber 312. The pressure therein is thereby increased and the overspeed power piston 198 rises. Although elevation of push rod 140 by cam 142 tends to reduce clearance between the push rod and lever 138, this clearance is increased in response to the upward movement of rod 200 and finger 202, the amount of clearance being greatest when the amount of engine overspeeding is greatest in respect to the new lower desired value of speed corresponding to the new lever position. The fuel flow decreases owing to counterclockwise movement of lever 138 as explained before; and, as the engine decelerates, the clearance between push rod 140 and lever 138 is reduced to a new value which remains substantially constant when equilibrium of the cooperating manual and speed control systems is again restored.

With the position of the engine control lever 62 fixed at any point in its range of operation, the engine speed may vary owing to variation in fuel quality, combustion temperature, or other factors over which the barometric or thermal control systems may or may not have control. Similarly torque changes produce changes in engine speed, the desired value of which nevertheless remains constant when the control lever position is constant. Such speed variation requires operation of the speed control system to maintain the speed at a desired substantially constant value.

Considering the manual and speed control systems only, when the position of the engine control lever is fixed and the engine speed increases, sleeve 206 is raised from its neutral position in respect to valve 314 and, as previously explained, the pressure acting upwardly on piston 198 is thereby increased. The overspeed power piston 198 rises and the process of reducing the variable control oil pressure ($p_c$), the fuel flow, and hence the engine speed, until a desired value of speed is restored, is as previously explained. When the engine speed decreases at a fixed position of the control lever, the process of increasing the fuel flow to restore the desired value of engine speed is substantially the reverse of the process explained in connection with overspeeding.

*Barometric control system*

The significance of lever mechanism 146 and positioning bar 180 and their relation to rod 144 are explained in the following description of the barometric control system and in subsequent explanation of the coordinated functions of the barometric and other component systems.

In the barometric control system, the upper end of bellows 164 is fixed inside casing 102 directly over bellows 166 which is of substantially the same effective area and which has its lower end fixed to a portion of wall 256. A bar 328 rigidly connects the free ends of the bellows to each other so that expansion or contraction of either is transmitted to the other in an equal and opposite sense. A cylindrical stop 330 limits contraction of bellows 166. Inside bellows 164 and at its upper end there is an adjustable spring support 332 the height of which can be varied as desired by means of a nut 334. Between the lower end of support 332 and the upper end of bar 328 there is a tension spring 336 for biasing the bellows and bar assembly upward in opposition to the compressor pressure differential acting on the bellows assembly. A cover 338 is provided for enclosing the support 332 and nut 334. The apparatus may be constructed so that cover 338 is removable from the exterior of casing 102 so that support 332 may be adjusted without disturbing any other part of the apparatus.

The barometric floating lever 168 is pivoted near its center on the bar 328, the left end of the lever being connected to the upper end of barometric valve 170 by means of a pin-and-slot connection which permits vertical movement of valve 170 in sleeve 172 as the angular position of lever 168 changes. The right end of lever 168 has a pin-and-slot connection with rod 176 which has its upper and lower ends respectively connected to link 178 and piston 174. Link 178 is pivotally connected to the left end of positioning bar 180 by means of a pin on which there is a roller 346 engaged with the fixed barometric cam 182. The position of cam 182 is established by pins at its opposite ends which are fitted into fixed supports. The cam 182 is slidable on the pins so that it can be removed from the apparatus for replacement or any other desired purpose. The right end of positioning bar 180 carries circular bearing 152. Roller 346 is held in contact with the upper contoured surface of fixed cam 182 by means of another roller 356 which is pivoted on a triangular bracket 360. Bracket 360 is pivoted to link 178. A spring 362, compressed between the link 178 and one side of the bracket 360, holds roller 356 against the lower side of cam 182. Thus, as rod 176 moves in a vertical direction, link 178 follows so that roller 346 remains in engagement with the contoured upper face of cam 182. Both vertical and angular movement are imparted to link 178 in this process so that: when piston 174 and rod 176 descend, bearing 152 is moved leftward and the downward force on main power piston 136 due to spring 154 is increased; and, similarly, when piston 174 and rod 176 rise, bearing 152 is moved rightward and the downward force on the main power piston 136 is decreased.

The barometric servo valve 170 is undercut to provide upper, middle and lower lands which separate upper and lower annular chambers between the valve and sleeve 172 in which the valve is slidable. The vertical position of valve sleeve 172 is fixed and the sleeve is rotated by means of a gear attached to its lower end and connected through a suitable train (not shown) to shaft 46. The valve sleeve has three annular grooves on its outside surface; and three corresponding sets of ports providing fluid communication through the sleeve on the approximate centerlines of the grooves.

In all operating positions of valve 170, the upper ports open into the upper annular chamber and the lower ports open into the lower annular chamber.

The central ports are just closed when valve 170 is in its neutral position, as shown in the drawing, the width of the ports being substantially equal to the width of middle valve land. The outlet passages 184 and 186 in sleeve 172 are also just closed by the upper and lower lands of the valve, respectively.

The central groove in sleeve 172 is connected to the end of conduit 126, which is continuously supplied with fluid at the pump discharge pressure. The lower groove is connected to one end of a conduit 380 which has its other end connected to an expansible chamber 382 below piston 174. The upper groove is connected to a conduit 384 which leads through two parallel paths to a chamber 397 above piston 174. One of these paths leads through a check valve 402 biased closed by a spring 400 and a conduit 399 to chamber 397. The other path leads from conduit 384 through a conduit 389, a slot 394 on main drive shaft 46, and a conduit 396 to chamber 397. As shaft 46 rotates, slot 394 restricts the flow between conduits 389 and 396 by intermittently obstructing, or "chopping" the connection between them. It is therefore descriptively referred to as a "chopper" valve. The area of slot 394 is substantially greater than that of an equivalent fixed restriction between the two conduits. A number of parallel slots may be substituted for the single slot 394, if desired.

When the barometric servo valve 170 is elevated above its neutral position, fluid is permitted to flow from conduit 126, past the valve and through conduit 380 to chamber 382, thereby increasing the pressure in chamber 382. Simultaneously, fluid is permitted to drain from chamber 397, through conduit 396, chopper valve 394, conduits 389 and 384, past valve 170, and through outlet passage 184 to reservoir 104. Fluid also drains from chamber 397 through check valve 402. Thus when valve 170 moves upward from its neutral position, the differential acting on piston 174 is in an upward direction, and piston 174 rises.

When valve 170 is depressed below its neutral position, fluid is permitted to flow from conduit 126 through conduits 384 and 389, chopper valve 394 and conduit 396 to chamber 197. Concurrently, fluid is permitted to drain from chamber 382 through conduit 380, past valve 170 and through outlet passage 186 to reservoir 104, causing the pressure in chamber 382 to decrease. Thus, when valve 170 moves downward from its neutral position, the differential acting on piston 174 is in a downward direction and piston 174 descends.

The position of rod 328 is determined by the pressure differential acting on bellows 164 and 166 and by spring 336, there being a different predetermined position of the rod 328 for each value of the differential, for a given fixed position of spring support 332. In steady state operation, when the barometric servo valve is in its neutral position, as shown, the positions of the barometric power piston 174 and rod 176 are predetermined by the position of rod 328 and the pressure differential acting on piston 174. This differential has a substantially constant value when the barometric control system is in equilibrium and equals zero when the apparatus is constructed so that no force is required to maintain bearings 152 and 240 in any fixed position.

The barometric control system varies the position of power piston 174 and rod 176 so as to maintain servo valve 170 in its neutral position, as the position of fulcrum pin 398 changes in response to changes in the value of the differential $(p_D - p_E)$. The position of fulcrum bearing 152 is determined by positioning bar 180 in response to movement of rod 176. The downward load on main power piston 136 is thereby established as a portion of the force of spring 154, which portion depends upon the position of bearing 152. Similarly, the position of bearing 240 is determined by positioning bar 169 by movement of bar 163 and rod 176. The downward force on the torque control servo valve 224 is thereby established as a portion of the force of spring 238, which portion depends upon the position of bearing 240.

Considering the barometric control system independently of the other four component systems, when a condition of equilibrium is disturbed by an increase in compressor discharge pressure ($p_D$) or a decrease in compressor inlet pressure ($p_E$), bar 328 and fulcrum pin 398 are lowered to a new position. Barometric floating lever 168 pivots about its right end, moving servo valve 170 downward. As previously described, this increases the pressure differential acting downwardly on piston 174 and the piston descends. The rate of increase of the pressure acting downwardly on piston 174 is controlled by chopper valve 394. The rate of change of position of the piston is thus controlled by the chopper valve when the compressor pressure differential increases. As the piston moves downward with pin 398 fixed in a new position corresponding to a new greater value of the differential ($p_D - p_E$), lever 168 turns clockwise about pin 398 and valve 170 rises. Equilibrium is restored when the servo valve reaches its neutral position, and when this occurs the position of piston 174 is again substantially constant.

In the above train of events, the particular value acquired by the pressure differential acting on piston 174 in restoring valve 170 to its neutral position is not important, since all that is required is that the position of rod 176 corresponds to the neutral valve position. If movement of rod 176 is opposed by frictional or other forces, the control operates to vary the pressure differential acting on piston 174 sufficiently to compensate such forces.

When the compressor pressure differential decreases, with the barometric control system in an initial state of equilibrium, bar 328 and pin 398 rise, causing clockwise movement of lever 168 about its connection with rod 176 and raising servo value 170 above its neutral position. As previously explained, the pressure differential on piston 174 now acts upwardly, thereby causing piston 174, rod 176 and the right-hand end of lever 168 to move upward, so that the servo valve moves downward toward its neutral position. During this process, check valve 402 opens, thereby allowing fluid to flow from chamber 397 so that the pressure therein decreases independently of chopper valve 394. Equilibrium of the barometric control system is restored with valve 170 in its neutral position, with fulcrum pin 398 in a new higher fixed position corresponding to the new lower value of the compressor pressure differential, with rod 176 in a corresponding new higher fixed position in which the upward and downward forces on the rod are in equilibrium, and with check valve 402 again seated. As is apparent from the drawing, when movement of fulcrum pin 398 displaces the barometric servo valve 170 in either direction from its neutral position, the barometric power piston 174 is required to move approximately twice as far in the same direction to restore the valve to its neutral position.

*Coordination of the manual, speed, and barometric control systems*

The manual, speed, and barometric control systems cooperate to regulate the fuel flow and engine speed as respective functions of manual control lever position, speed, and the compressor pressure differential ($p_D - p_E$). Principal functions of the combined manual and speed control systems are as previously explained on the assumption of a fixed position of bearing 152 in lever mechanism 146. The barometric control system varies the position of bearing 152 in response to the compressor pressure differential, thereby varying the downward force on main power piston 136 and hence varying the value of the variable control oil pressure ($p_c$) in chamber 160 and conduit 50.

As bearing 152 moves leftward in response to downward movement of the barometric power piston 174 produced by an increase of the compressor pressure differential, the force transmitted by the bearing from spring 154 and lever 150 to lever 148 and rod 144 is increased so that the value of the pressure ($p_c$) corresponding to the position of main control shaft 58 increases. Conversely, as bearing 152 moves rightward, corresponding to decrease of the compressor pressure differential, the pressure ($p_c$) decreases.

It is thus seen that the value of the variable control oil pressure ($p_c$) corresponding to any given position of the manual control lever 62, Fig. 1, depends upon the barometric control system, the pressure ($p_c$) increasing as the compressor pressure differential increases.

Since the compressor pressure differential increases as the engine speed increases, it follows that the barometric control system controls the rate of acceleration when the engine control lever is advanced. On movement of the manual control lever from one position to another corresponding to a higher rate of speed, the initial value of the pressure ($p_c$) corresponds to the initial value of the compressor pressure differential and to the initial lever position. The increase of pressure ($p_c$) due to movement of the manual control lever varies with the increase of the compressor pressure differential which occurs as the engine speed increases. The barometric control system thus serves to control acceleration and deceleration of the engine, subject to the limit imposed by cam 142.

When the entering air density increases, bearing 152 moves leftward to increase the pressure ($p_c$) and hence the fuel flow, as above explained. Conversely, as the flight speed decreases and the flight altitude increases, the compressor pressure differential decreases and bearing 152 moves rightward to decrease the variable control oil pressure ($p_c$). The barometric control is sometimes descriptively referred to as an altitude control, and fixed cam 182 is customarily contoured with closer regard to altitude compensation than to acceleration, particularly since regulation of the latter is accomplished to some extent by chopper valve 394.

The contour of the fixed elongated barometric cam 182 is developed to provide a different desired position of bearing 152 for each value of the compressor pressure differential.

*Torque control system*

In the torque control system, the torque control servo valve 224 is positioned in accordance with the balance or unbalance between an upward force due to the pressure in a chamber 404 acting on the lower end of the valve and a downward force transmitted to the valve from lever mechanism 236 through push rod 246. Since, as previously explained, the pressure in chamber 404 is a measure of the actual propeller torque, the upward force acting on valve 224 is likewise a measure of the propeller torque. The downward force on valve 224 is a measure of desired torque and equilibrium of the valve occurs when actual torque equals the desired torque. In a condition of equilibrium of the valve, the respective pressures in a chamber 406 above torque control power piston 226 and a chamber 408 below piston 226 are rendered constant at values such that their differential is equal and opposite to the downward force of spring 426 acting on piston 226. The position of the piston and hence the positions of segmental gear 228, and shaft 72 are thereby established. The propeller pitch has a value corresponding to the position of shaft 72 and the propeller torque is therefore constant at any given value of constant speed. It is the purpose of the torque control system to maintain equality between the desired and actual values of propeller torque and to maintain the propeller torque substantially at a value determined by the position of the engine control lever 62, Fig. 1.

Valve 224 is translatable in a bored portion of wall 256 and is rotated to prevent sticking. The valve is undercut to form upper and lower lands separated by a central annular chamber. The annular space above the upper land forms the outlet passage 252. The annular space below the lower valve land is connected to outlet passage 254. The lower end of the valve extends through a suitable guide into chamber 404, where it is subject to a pressure which is a measure of the actual torque.

In the neutral position of valve 224, the upper valve land just closes the left end of a conduit 418 which has its right end connected to chamber 406; and the lower land similarly just closes the left end of another conduit 420 which has its right end connected to chamber 408. Conduit 250 is connected to the central valve chamber so that, in all operating positions of the valve, that chamber is supplied with fluid at the pump discharge pressure.

When the torque control servo valve is displaced downward from the neutral position shown in the drawing, fluid is permitted to flow from conduit 250, through conduit 420 to chamber 408, thereby increasing the pressure below piston 226. Concurrently, fluid is permitted to flow from chamber 406, through conduit 418 and outlet passage 252 to reservoir 104, thereby decreasing the pressure in chamber 406. Piston 226 is thus caused to move upward, owing to increase of pressure ($p_7$) and decrease of pressure ($p_6$). Upward movement of piston 226 and the resulting counterclockwise movement of segmental gear 228 and shaft 72 cause shaft 70 in the propeller pitch control 68, Fig. 1, to turn counterclockwise and thereby increase the propeller pitch. This pitch increasing movement continues until the torque increases sufficiently so that the pressure in chamber 404 is increased enough to return valve 224 to its neutral position.

When the torque control servo valve is displaced upward from its neutral position, fluid is permitted to flow from conduit 250 through conduit 418 to chamber 406, thereby increasing the pressure above piston 226. Simultaneously, fluid is permitted to flow from chamber 408, through conduit 420, past valve 224, through outlet passage 254 to reservoir 104, thereby decreasing the pressure in chamber 408. Piston 226 is thus caused to move downward. Gear 228 and shaft 72 are consequently turned clockwise so that shaft 70, Fig. 1, turns clockwise to decrease the propeller pitch. The change in propeller pitch resulting from downward displacement of valve 224 from its neutral position continues until the propeller torque and the "torque oil pressure" in conduit 76 change sufficiently to restore valve 224 to its neutral position.

In order to increase the stability of the torque control system, I have provided a follow-up mechanism by which the force indicative of the desired torque is reduced whenever the torque power piston 226 moves in a torque increasing direction, and vice versa.

This stabilizing follow-up mechanism includes piston rod 230 and a spring 426 compressed between rod 230 and follower rod 231 which acts upwardly on the end of lever 234.

Whenever valve 224 moves downwardly from its neutral position, thereby causing an upward or torque increasing movement of piston 226, that upward movement compresses spring 426, causing it to apply an increased force to follower rod 231 and thence to lever 234. This increased upward force acting on lever 234 reduces the net downward force applied by that lever through bearing 240, lever 244 and push rod 246 to the upper end of valve 224. In a similar manner, an upward movement of valve 224 from its neutral position acts through the follow-up mechanism to increase the force acting downwardly on valve 224. It may therefore be seen that the follow-up mechanism has a stabilizing effect on the torque control system, since any force which moves valve 224 away from its neutral position acts through the follow-up mechanism in a manner tending to restore the valve to its neutral position.

Follower rod 231 and piston rod 230 are slidable in a guide 428 which is shown as an extension of wall 256. Rod 231 has a slot 430 at its upper end to permit vertical movement of the rod independently of a pin 432 which is fixed in guide 428 and on which lever 244 is pivoted. Lever 244 pivots on pin 432 without interfering with guide 428.

The fuel and torque control apparatus provides four ways of varying the downward force on valve 224; i. e., four ways of varying the force measure of desired torque in order to vary the propeller torque:

1. By by means of the engine control lever 62, Fig. 1, through operation of cam 242 on the main control shaft.
2. By means of movement of bearing 240 in lever mechanism 236 in response to movement of piston 174 in the barometric control system.
3. By overriding action of the speed control system, through flange 187 acting on torque floating lever 248, when a predetermined value of engine speed is exceeded.
4. By overriding action of the temperature control system, through lever 215 acting on torque floating lever 248, when a predetermined value of engine temperature is exceeded.

Within the 20°–90° range of positions of control lever 62, clockwise movement of the lever 62, Fig. 1, and of the main control shaft 58 causes cam 242 to turn clockwise, thereby increasing the cam lift and causing push rod assembly 192 to move upward. As push rod assembly 192 is raised, it moves lever 232 counterclockwise, thereby increasing the load of spring 238 on lever 234. Spring 238 is thereby further compressed and lever 234 turns clockwise on its fulcrum, applying a downward force through bearing 240, lever 244 and push rod 246 to the upper end of valve 224.

Following downward displacement of valve 224 from its neutral position, the propeller pitch and propeller torque are increased, as previously explained, and the resulting increase of pressure ($p_7$) restores the torque control system to equilibrium. The increased value of propeller torque corresponds to the new position of the engine control lever.

When the control lever is retarded in a counterclockwise direction in its 90°–20° range of movement, a reversal occurs of the process just described, the propeller torque being decreased to a lower value corresponding to the retarded lever position.

The torque change obtained as the control lever is moved between any two positions in the operating range is determined by cam 242, which may be developed to suit any desired schedule of control.

Push rod assembly 192 is actuated by cam 242 in response to movement of the engine control lever 62, Fig. 1, for varying the position of lever 232, and hence for varying the load of spring 238 on lever 234. Assembly 192 includes the follower push rod 290 which has its lower end slidably operable in the hollow upper end of push rod 296 which engages cam 242. A spring 298 retained between flanges on the push rods 296 and 290 tends to maintain the overall length of the push rod assembly at a value determined by engagement of a pin 300 in push rod 296 with the lower end of a slot 302 in follower push rod 290. When, however, lever 232 contacts an adjusting screw 304 so that further upward movement of rod 290 is prevented, upward movement of push rod 296 is permitted by compression of spring 298, the length of slot 302 and the distance between the lower end of rod 290 and rod 296 being sufficient to prevent jamming of the push rod assembly.

The floating lever 248 is pivoted on a central stationary support. The left end of lever 248 is forked for support of a sleeve 440 whose upper end is engageable with the left end of lever 244. If desired, a spring 438 may be placed between sleeve 440 and lever 244. The push rod 246 is slidable inside sleeve 440.

In the foregoing discussion, the right-hand end of lever 248 is assumed to be free, as shown, so that movement of lever 244 is not affected by sleeve 440 and lever 248.

Coordination of the torque and barometric control systems

The relationship between the torque control system and the barometric control system is similar to that between the latter and the manual control system. The barometric control system modifies the torque as a function of the compressor pressure differential which, as explained before, varies with altitude, speed of flight, and other factors, by varying the position of bearing 240 in mechanism 236.

Bearing 240 is mounted on the end of bar 169. The upper end of link 165 is pivoted to the left-hand end of positioning bar 169 by means of a pin on which is mounted a roller 444. Roller 444 is held against the contoured face of the fixed elongated cam 167 through the action of a roller 446 rotatable on a pin in a bracket 450. A spring 452 is compressed between a portion of bracket 450 and link 165 for maintaining rollers 444 and 446 in contact with their respective sides of cam 167. The latter is held in place by a pair of fixed pins from which cam 167 may be removed for replacement or other desired purposes.

The load on spring 238 corresponding to predetermined positions of the engine control lever and the bearing 240 is established in design of the apparatus. The downward load on valve 224 is proportional to the load on spring 238. The value of the proportionality and hence the downward force on the valve, which measures the desired torque, is varied by the positioning bar 169 which responds to the barometric control system according to the contour of fixed cam 167.

When the compressor pressure differential has a maximum value and piston 174 is consequently in its lowest position, bar 163 and link 165 are correspondingly at their extreme downward positions, and bar 169 maintains bearing 240 in its maximum leftward position. The downward load transmitted from spring 238 to valve 224 through lever mechanism 236 then has a maximum value for any given position of the engine control lever and cam 58. With the position of the engine control lever fixed, the rate of change of torque in response to changes in the value of the compressor pressure differential is controlled by the barometric control system in a manner substantially the same as the barometric control system controls the rate of change of the variable control oil pressure ($p_c$), as previously explained. When the engine control lever is farthest advanced toward the right and the lift of cam 242 is maximum, the value of torque for any given value of the compressor pressure differential is maximum; and, when the engine control lever is retarded to a position in the 20°–0° range of operation and the lift of cam 242 is minimum, the value of torque for the same given value of the compressor pressure differential is minimum.

The position of the right end of lever 244 is fixed by its pivotal mounting. Since the neutral position of valve 224 is fixed, the left end of lever 244 has the same datum position under all steady state conditions. Therefore, the mechanical advantage between spring 238 and valve 224 is always determined solely by the position of roller 444 on cam 167, and does not vary for different values of torque. This permits more accurate contouring of cam 167.

Contrast the action of lever mechanism 146, where the datum position of the left end of lever 148 (corresponding to the neutral position of valve 132) may vary. There the mechanical advantage of spring 154 depends not only on the position of roller 346 on cam 182, but also on the particular datum position of lever 148. This entails some compromise in the design of cam 182 to secure a satisfactory result.

Coordination of the torque and speed control systems

At any value of the pressure ($p_E$) of air entering the engine, the relationship between propeller torque and the engine speed is similar to the relationship between the torque and the compressor pressure differential, since the differential varies between maximum and minimum values corresponding to maximum and minimum values of engine speed.

When the engine speed exceeds a predetermined value and the speed override power piston 198 rises to reduce the variable control oil pressure ($p_c$) and the fuel flow, the engine speed decreases as previously explained. As the speed decreases, the desired value of torque decreases owing to decrease of the compressor pressure differential and the actual torque similarly decreases because of the reduced speed.

When the engine speed is below the value predetermined by the control lever position and the speed override power piston 198 descends so as to increase the fuel flow, the desired propeller torque setting is unchanged unless the engine speed is sufficiently below the desired predetermined value to cause the flange 187 on overspeed power piston rod 200 to engage the right-hand end of lever 248. When this occurs, lever 248 turns clockwise about its fulcrum and moves sleeve 440 upward. The resulting increased load of spring 438 decreases the downward force on the torque control servo valve 224. The propeller torque consequently decreases, allowing the engine speed to increase without a corresponding increase in power output. Thus, in this condition, the engine is unloaded while the fuel flow is being increased in order to increase the engine speed to the desired predetermined value. As the speed reaches a value at which collar 187 and lever 248 are again disengaged, the speed and manual control systems continue to cooperate to increase the fuel flow and engine speed.

As previously stated, the cams 196 and 242 are so contoured that, as control lever 62 is moved clockwise from its 0° position to its 90° position, speed is increased while torque is held constant at a minimum value during the first 20° of movement, while during the last 60° of movement, speed is held constant at a maximum value and torque is gradually increased. Between these two ranges of movement of control lever 62 is an intermediate range (20°–30°) not important in the immediate discussion, in which both speed and torque are increased.

In order to hold the speed substantially constant during the last 60° of travel of lever 62, the lift of cam 196 must be made to increase gradually. The reason for this may be understood from the following: in order to increase torque at constant speed, as is desired under the conditions in question, it is necessary to increase power output and hence fuel flow; in order to increase fuel flow, the pressure in chamber 160 under piston 136 must be increased, thereby raising piston 136; in order that piston 136 may be raised, with valve 132 remaining in its neutral position, the right end of lever 138 must be lowered; therefore, piston rod 200 and piston 198 must be lowered; in order to permit piston 198 to be lowered while the speed remains constant, cam 196 must be contoured so that the load on spring 292 is gradually increased as the required fuel delivery to the engine is increased, giving governor valve sleeve 206 a new neutral position, lower than its previous position, with each increment of fuel flow required. In this way, the fuel flow may be increased to increase the power output, while holding the speed constant. To those familiar with the governor art, this may be summarized by saying that cam 196 must be contoured to compensate for governor droop.

The maximum power output is attained, in the present arrangement by the movement of the control lever 62 to a position of maximum torque. Since the speed is a maximum substantially throughout the 30°–90° range of lever 62, the torque cam contour, rather than the speed cam contour, finally determines the maximum power output. It is desired, in engines of the turbine type, to operate as close to the maximum permissible limit of power output as possible. It is therefore desirable to be able to adjust the maximum power output which the control apparatus will permit, after the apparatus is assembled. I have provided such an adjustment, which is shown as an adjustable stop 304 for lever 232. In order to permit continued rotation of cam 242 after lever 232 has engaged stop 304, the collapsible push rod assembly or strain release mechanism 192 is provided.

*Thermal control system*

The thermal control system is essentially a means for overriding the manual control to reduce the fuel flow and the engine speed and torque when a predetermined limiting value of temperature is exceeded.

Thermal control 100, as shown, includes a rod-and-tube thermostat of generally conventional construction, operating a valve 476. It is preferably made so that the valve remains closed until the predetermined limiting temperature is exceeded. The control is installed with thermostat exposed to the engine temperature, as in the tail pipe 30 of the engine of Fig. 1. Then, when the tail pipe temperature exceeds the limiting value, the valve opens to permit flow from conduit 470 through conduit 468 to reservoir 104. The pressure in conduit 470 and chamber 472 is decreased as valve 476 opens.

The thermal piston 208 functions as a chopper valve similar to chopper valve 394 in the barometric control system. It consists of a generally cylindrical center portion rotatable in an apertured portion of wall 256 by means of a shaft 478 which is rotated concurrently with shaft 46. Push rod 209 is attached to the upper end of piston 208 and extends through wall 256 for engagement with finger 141 in the manual control system, when the engine temperature exceeds a predetermined value. Push rod 209 is provided with an extension 213, which engages a lever 215 when the limiting temperature is exceeded. Piston 208 is biased upward by a spring 482, and it is provided with a slot 484 the upper end of which opens into chamber 472. When the piston is rotated, chamber 472 is intermittently connected through slot 484 to the upper end of a conduit 486 which branches from conduit 126. Chamber 472 is simultaneously intermittently connected to one end of another conduit 488, the other end of which is usually closed by push rod 296.

When valve 476 in thermal control 100 is closed, the pressure in chamber 472 is maintained at the pump discharge pressure, as in conduits 126 and 486, and piston 208 is held downward by the difference between that pressure and the reservoir pressure acting on the lower end of the piston, so that push rod 209 does not contact finger 141 in the manual control system nor cause extension 213 to engage lever 215 in the temperature control system. When the limiting engine temperature is exceeded, however, valve 476 opens and fluid is drained from chamber 472, and the pressure therein is reduced, so that spring 482 forces piston 208 upwards and causes extension 213 on push rod 209 to engage lever 215 which then turns counterclockwise on a fixed pin and causes the torque control floating lever 248 to turn clockwise on its fulcrum. As previously explained, this moves sleeve 440 upward and the downward force on the torque control servo valve 224 is thereby decreased. The desired torque and hence the actual torque decreases and the engine tends to overspeed. After extension 213 engages lever 215, however, push rod 209 engages finger 141 and forces it into engagement with adjusting screw 139. The main floating lever 138 is thereby turned counterclockwise about connection 275 and the variable control oil pressure ($p_c$) and hence the fuel flow to the engine are thereby reduced. The temperature control system continues to override the manual and torque control systems until the temperature has been restored to the predetermined or a slightly lower value.

In the process just described, decreasing the torque in advance of decreasing the fuel flow allows the engine to maintain a higher value of speed than would be possible with no torque change whatever. The high speed results in the continuance of a high rate of air flow while the fuel flow is reduced. The high air flow cools the engine more rapidly than would be the case if fuel and speed were reduced simultaneously.

In conjunction with the thermal control system as thus far described, provision is made for supply of fluid at pump discharge pressure to conduit 488 at a certain range of power output. An annular groove 492 is provided in a portion of rod 296 which is guided in a portion of casing 102. One end of conduit 496 which is connected to conduit 128 enters portion 494 of the casing at a point opposite the right end of conduit 488. Communication between conduits 494 and 496 is cut off when push rod 296 is in the position shown in the drawing.

In a predetermined range of movement of the engine control lever approaching the maximum power position of the lever, groove 492 is elevated to permit flow from conduit 128, through conduit 496, past the groove and through conduit 488. When, under this condition, the temperature control valve 476 opens, the pressure in chamber 472 corresponding to any opening past valve 476 is greater than in the previously explained case in which conduit 488 was closed by rod 494.

Thus, while the action of thermal control 100 is always the same in respect to temperature and rate of valve opening, the response of thermal oil piston 208 is less rapid when the control lever is in the predetermined advanced range above referred to, in which the engine power setting approaches its maximum or limiting value. This operation is termed "resetting" the thermal control system.

The two kinds of thermal override control are sometimes referred to as applying to normal and emergency operation, respectively. The normal control is obtained with groove 492 closed, as shown in the drawing. When the lever is advanced to and within the predetermined range in which fluid may flow across groove 492, thermal override occurs less rapidly and at a higher value of engine temperature than is normally true. This is the emergency operation phase of the thermal control. Provision of the thermal control "reset" is for the purpose of avoiding diminished fuel flow due to thermal control operation during critical maneuvers such as take-off when the hazards involved in even a slight interruption of flow are prohibitive.

*General operation*

For the purpose of more completely explaining the function of the fuel and torque control apparatus, the following brief account is given of its operation during several typical conditions encountered in flight.

Since operation of each and of various combinations of the component systems of the control apparatus has been previously explained in considerable detail, only principal reactions to various specified changes will be stated in the present discussion.

*Case 1.*—Assuming that an aircraft carrying the engine is airborne at 2,000 feet altitude and flying at 400 M. P. H. with the engine control lever set at 60° quadrant position, so that the engine speed is maximum, and that the pilot desires to accelerate the aircraft to maximum forward speed and that he therefore advances the control lever to the 90° or maximum power position.

Cams 196, 142, and 242, on the main control shaft 58, turn clockwise simultaneously. Since the engine was operating at maximum speed, the clockwise rotation of cam 196 in the speed control system has no effect and does not increase the selected engine R. P. M.

Clockwise movement of cam 242 increases the selected value of propeller torque by increasing the downward force on servo valve 224. As the propeller pitch and hence the torque is increased, the engine speed decreases and overspeed power piston 198 descends in response to the increased speed, so that the main floating lever 138 is no longer supported by finger 202 on the overspeed power piston rod 200. Instead, adjusting screw 139 engages finger 141, which now descends owing to the clockwise movement of cam 142. Clockwise movement of lever 138 about connection 275 increases the variable control oil pressure ($p_c$) so that the fuel flow is increased and the engine is then able to carry the increased load substantially without any permanent speed change. Since the cams move simultaneously, all of the foregoing reactions are concurrent so that the actual speed deviation from the selected maximum value is small, the increase in torque being almost immediately followed by a corresponding fuel increase for producing the increased torque without changing the speed more than an amount predetermined by characteristics of the governor valve mechanism 188.

As the speed of the aircraft increases, the compressor pressure differential increases owing to increased ram at the air entrance and the barometric control system responds by moving bearings 152 and 240 leftward, thereby increasing the variable control oil pressure ($p_c$) and hence the fuel flow, as well as the propeller torque. It has been shown before that, regardless of the control lever setting at 90°, the engine cannot deliver maximum power until the differential has a maximum value.

Assuming that the entrance air pressure corresponding to any value of flight speed is constant, equilibrium is restored with the engine speed remaining substantially constant at its initially assumed value, with a substantially constant value of propeller torque corresponding to the lever position and the value of the differential when the flight speed attains a substantially constant value, and with a substantially constant rate of fuel flow corresponding to the engine speed and torque.

*Case 2.*—With the engine delivering maximum safe power at 2,000 feet altitude, it is assumed that the pilot desires to climb to an altitude of 15,000 feet without changing the control lever position.

As the aircraft climbs, the compressor pressure differential decreases because of the altitude increase and because the speed of flight decreases. In consequence, the barometric control system causes both the propeller torque and the fuel flow to decrease. After leveling off at 15,000 feet, equilibrium is again restored with the engine delivering a new lower value of maximum safe power corresponding to the lever position and the new value of the compressor pressure differential obtained at 15,000 feet when the flight speed becomes substantially constant.

It may be noted here that, in level flight in air of constant density and pressure and at constant engine speed, as flight speed increases the propeller pitch is increased by the torque control system in order to maintain the desired torque. It is characteristic of propellers that as air speed increases, their pitch must be increased to maintain the same torque load.

*Case 3.*—While in level flight at 15,000 feet altitude, at maximum safe power, as explained in Case 2, it is now assumed that the pilot desires to land and that he retards the control lever to idling position in the 0°–20° range of lever movement.

In this instance, cams 196, 142, and 242 move counterclockwise. In the manual control system, push rod 140 rises to turn lever 138 in a fuel flow decreasing direction. Similarly, cam 242 in the torque control system causes valve 224 to decrease the torque to a minimum value. Meanwhile, the engine is overspeeding owing to its momentum and tends to continue overspeed owing to the torque decrease, so that the overspeed power piston 198 rises causing lever 190 to contact screw 325 under which condition the fuel flow has a minimum value. The rate of change of compressor pressure differential varies with the speed of descent, with the altitude decrease, and with the engine speed as deceleration takes place. Equilibrium is approached as the aircraft lands, and thereafter the engine continues to idle at constant minimum values of torque, speed, and fuel flow until the latter is cut off and engine operation ceases.

Coordination of the manual, torque, barometric, speed, and temperature control systems in all other flight maneuvers or conditions of engine operation is in accordance with principles set forth in the foregoing description and specific cases.

*Figs. 3–8*

Referring to Fig. 3 of the drawing, there is shown a cross-sectional view of actual apparatus built in accordance with the diagrammatic showing of Fig. 2. Those elements of Figs. 3, 4, 5, 6, 7, and 8 which correspond to their counterparts in Fig. 2 have been given the same reference numerals and may not be further described in connection with Figs. 3, 4, 5, 6, 7, and 8.

The paths of fluid flow in the apparatus of Figs. 3–8 are substantially the same in all functional aspects as those described in connection with Fig. 2; the particular sections of Figs. 3–8, however, are negligibly illustrative of any conduits and/or passages corresponding to those shown somewhat diagrammatically but nevertheless completely in Fig. 2. In descripion of Figs. 3–8, therefore, reference to many structural details of fluid flow paths are necessarily omitted.

Instead of a casing 102 such as employed in the apparatus of Fig. 2, the embodiment of Fig. 3 includes four major castings; namely, a flange casting 498, a base casting 500 separably fastened to the flange casting, a bracket 502 and a cover 504, both the latter being mounted on base 500. Upon removal of the cover casting, a major portion of the working parts of the apparatus subject to adjustment and inspection or other operations during calibration, test, and service are rendered easily accessible.

The flange casting 498 is mountable on the engine for supporting the apparatus so that a spline 506 on shaft 46 carried by the flange casting may engage suitable driving mechanism in the engine. Spline 506 is at the lower end of the shaft 46 and the upper end of shaft 46 is approximately flush with the upper face of the flange casting. The drive shaft is keyed to a gear 508 in fluid pump 112 for operation of the pump, the shaft being guided by a pump housing 510 and a complementary pump end cap 512. A gear 514 is keyed to the upper end of shaft 46.

Base casting 500 is provided with a centrally located bearing 516 in which a shaft 518 rotates. The lower end of shaft 518 and the upper end of shaft 46 are provided with mating teeth which engage when base and flange castings are assembled together, but the castings are separable without removal of either shaft from its associated casting. Connections between the various gears which are required to rotate valves, sleeves, and pistons, are not completely shown. All gears shown are for the purpose of providing such rotation, the particular system of gearing employed being dependent on arrangement of the various rotated elements. In Fig. 3, a pair of idling gears 520 and 522 fixed to each other and rotatable on shaft 518 are included in the gear system.

The base casting 500 also houses a sleeve 524 in which the overspeed power piston 198 operates, and bellows 166 of the barometric control system. The flyball speed responsive device 280 is drivably fastened to the upper end of shaft 518 and is accessible for removal from shaft 518 when bracket 502 is removed from base 500.

Base 500 is provided with a number of studs 526 upon which the somewhat irregularly shaped bracket casting 502 is mounted. The bracket supports bellows 164 in the barometric control system, bellows 164 and 166 having a threaded connection 527 corresponding to bar 328 of Fig. 2. Instead of connection 398, as in Fig. 2, the barometric lever 168 is provided with a pair of pins 528 which engage a slotted adjustable bearing 530 locked to connection 527 by means of a nut 532. The barometric control includes spring 336 and the adjustable spring support 332 as in Fig. 2.

Governor valve mechanism 188 is mounted on bracket 502 and comprises elements previously shown in Fig. 2, including setting lever 194, governor spring 292, and governor valve 314. Instead of the pin-and-slot connection between lever 190 and valve 314, as shown in Fig. 2, a fulcrum bearing 534 is provided in the valve of Fig. 3. The mechanism of Fig. 3 also includes an adjustable stop 536 for limiting the maximum compression of spring 292, and another adjustable stop 538 for limiting minimum compression of the spring. A light spring 540 is compressed between the lower end of stop 536 and the upper end of valve 314 for maintaining bearing 534 in contact with lever 190. Instead of collar 187, Fig. 2, the overspeed power piston rod 200 of Fig. 3 is provided with a pair of adjustable lock nuts 542; the end of lever 248 appears slightly below lock nuts 542. A pair of nuts 541 and 543 are threaded to each other and are slidable on the rod 200. These nuts limit the upward travel of rod 200 when they are moved into engagement with the under surface of bracket 502 by lock nuts 542. They therefore perform the same function as limit stop 325 of Fig. 2. The nuts 541 and 543 may be locked to each other by wires or other suitable means to make their adjustment permanent.

Stop 536 is adjustable by means of a sleeve 544 attached to cover 504. Sleeve 544 is slotted at its lower end for engaging a pin 546 in stop 536 and its position in the cover may be fixed by a lock nut 548. Cover 504 is removable without disturbing the stop adjustment.

The interior of cover 504 and corresponding openings in base and flange castings 500 and 498 comprise the reservoir 104. All gears, levers, pivots, bearings, and other working elements, not otherwise lubricated in the process of fluid pressure control, operate in a continuous oil bath.

Referring to Fig. 4 of the drawing, the base casting 500 is there shown to house certain principal elements in the torque control mechanism, as follows: segmental gear 228 on shaft 72, torque power piston 226 slidable in a guide 550, and the torque control servo valve 224 operating in a valve guide 552. Above the base 500 and connected to bracket casting 502 are other elements in the torque control system substantially as diagrammatically shown in Fig. 2.

In Fig. 4, lever 232 is shown to be provided with an adjustable spring support 553 so that the load on spring 238 corresponding to a given position of lever 232 may be varied.

In Fig. 5 there are shown the main servo valve 132, the main servo valve sleeve 134 rotated by a gear 259, the main power piston 136 in a piston guide 554, gear 260 for rotating the piston 136, a spring anchor 556 at the lower end of a tension spring 558 which replaces spring 154 of Fig. 2, the barometric power piston 174 moving in a guide 560, and piston rods 144 and 176.

Portions of the manual and barometric control system appearing in Fig. 5 include: main floating lever 138 connected to valve 132 and rod 144, barometric floating lever 168 pivoted to rod 176, link 178, barometric cam 182, positioning bar 180, bearing 152, levers 150 and 148, and an adjustable spring support 561 for varying the load of spring 558 on lever 150.

Gear 260 of Fig. 5 and gear 262 of Fig. 4 both engage an idler gear (not shown) located between them on the end of an idler shaft (not shown) which extends through the base casting 500 and carries at its lower end a gear which is driven through a suitable train by shaft 518. Gear 259 is also driven through a suitable train by shaft 518.

A spring 559 in Fig. 5 biases lever 138 downwardly to maintain the left end of the lever (as it appears in Fig. 5) in engagement with either finger 202 or finger 141.

Referring to the Fig. 6, there is shown a section through the control apparatus of Figs. 3, 4, 5, 7, and 8, as indicated by section line 6—6 on Fig. 3. The principal purpose of Fig. 6 is to indicate locations of sections 3—3, 4—4, 5—5, 7—7, and 8—8 corresponding to Figs. 3, 4, 5, 7, and 8, respectively.

Fig. 6 illustrates the interlocking lever 215 which connects the temperature and torque control systems. It may be noted that, as shown in Fig. 6, the lever 215 is operated by finger 141 rather than by an extension 213 on rod 209, as shown in Fig. 2. Screw 139 is then adjusted so that, when the limiting temperature is exceeded, the finger 141 operates lever 215 to reduce torque before fuel is reduced by engagement of finger 141 with screw 139.

If desired, the interlocking lever 215 may be omitted. In such a device, the occurrence of excessive temperature causes piston 208 to move upwardly, thereby raising finger 141 into engagement with screw 139 and reducing the fuel supply. Since the torque is maintained at its previous value, the reduction of the fuel supply reduces the speed below its selected value. If the speed reduction continues sufficiently far, then collar 187 on piston rod 200 engages lever 248, moving it clockwise and thereby reducing torque.

Fig. 7 illustrates certain parts of the temperature override control system. These parts generally correspond to their counterparts in Fig. 2. However, there is additionally shown an adjusting screw 602 in the finger 141. The point in the travel of piston 208 at which finger 141 starts to move may be adjusted by this screw.

Fig. 8 illustrates the details of the cams 142, 196 and 242 operated by shaft 58, and their associated cam follower mechanisms.

The terms and expressions used herein are employed for purposes of description and not of limitation, and I have no intention, in the use of such terms and expressions, of excluding any equivalents of the features shown and described or portions thereof, but recognize that various modifications are possible within the scope of the invention claimed.

I claim as my invention:

Apparatus for controlling the pitch of a variable pitch propeller, comprising pitch varying means, control means for said pitch varying means including a control element having a neutral position in which said pitch remains constant and effective upon opposite movements from said position to cause variation of said pitch in opposite senses, means responsive to the torque of said propeller for moving said element in one direction, means including a spring for applying a force to said element in the opposite direction to determine the value of torque which will maintain said element in said neutral position, a retainer for said spring, means for moving said retainer to vary the force applied to said element by said spring, said moving means comprising a manually movable cam, a follower for said cam, and a connection between said follower and said retainer, means for limiting the movement of said retainer to establish the maximum value of said torque, means for adjusting said limiting means, and a strain release in said connection to permit continued movement of said cam after said strain release is effective.

References Cited in the file of this patent

UNITED STATES PATENTS

| | | |
|---|---|---|
| 1,910,766 | Hobson | May 23, 1933 |
| 2,217,364 | Halford | Oct. 8, 1940 |
| 2,231,292 | Neugebauer | Feb. 11, 1941 |
| 2,300,419 | Hammond | Nov. 3, 1942 |
| 2,303,998 | Holley | Dec. 1, 1942 |
| 2,322,303 | Martin | June 22, 1943 |
| 2,370,844 | Davis | Mar. 6, 1945 |
| 2,391,323 | Martin | Dec. 18, 1945 |
| 2,402,885 | Gilfillan et al. | June 25, 1946 |
| 2,430,197 | Wells et al. | Nov. 4, 1947 |
| 2,437,546 | Meripol | Mar. 9, 1948 |
| 2,457,595 | Orr | Dec. 28, 1948 |
| 2,645,293 | Ogle et al. | July 14, 1953 |